(12) United States Patent
Owens

(10) Patent No.: US 10,486,610 B1
(45) Date of Patent: Nov. 26, 2019

(54) VEHICLE CARRIER RACK

(71) Applicant: Jerry Owens, Almont, MI (US)

(72) Inventor: Jerry Owens, Almont, MI (US)

( * ) Notice: Subject to any disclaimer, the term of this patent is extended or adjusted under 35 U.S.C. 154(b) by 0 days.

(21) Appl. No.: 15/967,920

(22) Filed: May 1, 2018

(51) Int. Cl.
*B60R 9/06* (2006.01)

(52) U.S. Cl.
CPC ..................................... *B60R 9/06* (2013.01)

(58) Field of Classification Search
CPC ........................................................ B60R 9/06
USPC .................................. 224/282, 401, 454, 456
See application file for complete search history.

(56) References Cited

U.S. PATENT DOCUMENTS

| | | | | |
|---|---|---|---|---|
| 1,467,504 A * | 9/1923 | Sabarros | ............... | B60P 1/4407 414/438 |
| 1,817,056 A * | 8/1931 | Belgard | .................... | B60R 9/06 108/47 |
| 2,930,500 A * | 3/1960 | Ellis | ......................... | B60R 9/02 193/38 |
| 3,822,801 A * | 7/1974 | Morgan, Jr. | .............. | B60R 9/06 414/462 |
| 5,236,062 A * | 8/1993 | Laney | ................... | A01M 31/02 182/116 |
| 5,630,342 A * | 5/1997 | Owoc | .................. | B25B 13/461 81/177.75 |
| 6,589,004 B2 * | 7/2003 | Reed | ..................... | B60P 1/4407 414/434 |
| 6,638,001 B1 * | 10/2003 | McKinley | ............. | B60P 1/4407 224/401 |
| 6,769,858 B1 * | 8/2004 | Butler | ................... | B60P 1/4421 414/462 |
| 6,869,265 B2 * | 3/2005 | Smith | ................... | B60P 1/4407 414/462 |
| 7,293,680 B1 * | 11/2007 | Wawerski | ................. | B60R 9/00 224/401 |
| 7,293,951 B2 * | 11/2007 | Meeks | ................... | B60P 1/4407 414/462 |
| 7,296,959 B2 * | 11/2007 | Davis | ........................ | B60R 9/06 224/401 |
| 8,656,615 B1 * | 2/2014 | Fournier | ................ | E01H 5/061 172/272 |
| 8,763,280 B1 * | 7/2014 | Fournier | ................... | E01H 5/06 172/272 |
| D772,782 S * | 11/2016 | Johnson | ........................ | D12/412 |
| 9,637,356 B2 * | 5/2017 | Birch | ....................... | B66C 23/44 |
| 9,889,786 B1 * | 2/2018 | Stojkovic | .............. | B60P 1/4407 |
| 2002/0070255 A1 * | 6/2002 | Hebert | ..................... | B60R 9/06 224/401 |

(Continued)

*Primary Examiner* — Nathan J Newhouse
*Assistant Examiner* — Lester L Vanterpool
(74) *Attorney, Agent, or Firm* — Quinn IP Law

(57) ABSTRACT

An apparatus includes a bracket and a rack. The bracket may be attachable to a vehicle. The rack may include (i) a rail having a U-shape forming two side sections separated by a handle section, (ii) a respective joint at each free end of the rail and pivotally connected to the bracket and (iii) cross members attached between the side sections of the rail. The rail generally forms a carry section and a retainer section. The side sections may include a curve. The rail may be rotatable about the joints. The handle section may be in contact with a ground while the rack is in a load position. The retainer section may be approximately parallel to a hood of the vehicle while the rack is in a stored position. The retainer section may be approximately perpendicular to the ground while the rack is in a carry position.

18 Claims, 11 Drawing Sheets

(56) References Cited

U.S. PATENT DOCUMENTS

| | | | | |
|---|---|---|---|---|
| 2002/0168257 | A1* | 11/2002 | Smith | B60P 1/4407 |
| | | | | 414/462 |
| 2005/0224544 | A1* | 10/2005 | Myers | B60R 7/02 |
| | | | | 224/401 |
| 2006/0104767 | A1* | 5/2006 | Dugger | B60R 9/06 |
| | | | | 414/462 |
| 2006/0182571 | A1* | 8/2006 | Hightower | A01K 15/00 |
| | | | | 414/466 |
| 2007/0080548 | A1* | 4/2007 | Joseph | B60R 19/48 |
| | | | | 293/117 |
| 2008/0292435 | A1* | 11/2008 | Turner | B60P 1/4407 |
| | | | | 414/462 |
| 2009/0020576 | A1* | 1/2009 | Gale | B60R 9/06 |
| | | | | 224/498 |
| 2010/0111658 | A1* | 5/2010 | Galliano | A01M 31/006 |
| | | | | 414/462 |
| 2010/0301592 | A1* | 12/2010 | Longwell | B60R 9/06 |
| | | | | 280/769 |
| 2011/0168417 | A1* | 7/2011 | Benesch | B66F 9/065 |
| | | | | 172/829 |
| 2014/0271068 | A1* | 9/2014 | Baumann | B60P 1/4407 |
| | | | | 414/469 |
| 2016/0052560 | A1* | 2/2016 | Peterson | B60R 21/13 |
| | | | | 280/154 |

\* cited by examiner

VEHICLE CARRIER RACK

FIELD OF THE INVENTION

The invention relates to all-terrain vehicle add-ons generally and, more particularly, to a method and/or apparatus for implementing a vehicle carrier rack.

BACKGROUND

All-terrain vehicles are conventionally used for hunting in the outdoors and general work around farms and construction sites. The all-terrain vehicles commonly include a hood-mounted rack or a trunk-mounted rack for hauling heavy objects. However, moving the heavy objects between the ground and either the hood-mounted rack or the trunk-mounted rack is difficult due to the weights involved. Conventional mechanically-powered lifts are available. However, the power lifts require extensive integration into an electrical power system of the all-terrain vehicle and so are expensive. Power lifts mounted on a front of the all-terrain vehicles can obstruct the front headlights making nighttime operations difficult.

It would be desirable to implement a vehicle carrier rack.

SUMMARY

The invention concerns an apparatus including a bracket and a rack. The bracket may be attachable to a vehicle. The rack may include (i) a rail having a U-shape forming two side sections separated by a handle section, (ii) a respective joint at each free end of the rail and pivotally connected to the bracket and (iii) cross members attached between the side sections of the rail. The rail generally forms a carry section and a retainer section. The side sections may include a curve. The rail may be rotatable about the joints. The handle section may be in contact with a ground while the rack is in a load position. The retainer section may be approximately parallel to a hood of the vehicle while the rack is in a stored position. The retainer section may be approximately perpendicular to the ground while the rack is in a carry position.

BRIEF DESCRIPTION OF THE FIGURES

Embodiments of the invention will be apparent from the following detailed description and the appended claims and drawings in which:

DETAILED DESCRIPTION OF THE EMBODIMENTS

Embodiments of the present invention include providing a vehicle carrier rack that may (i) lay flat on a hood of the vehicle while in a stored position, (ii) include a curved end to match a profile of the vehicle, (iii) include a retainer section that aids in holding objects being transported, (iv) not disturb a headlight pattern of the vehicle, (v) be quickly disconnected from the vehicle, (vi) be in contact with a ground while in a load position to easily accept and/or remove one or more objects being carried, (vii) provide leverage to manually lift and/or manually lower the objects between the load position and a carry position, (viii) be light weight and/or (ix) leave a front rack of the vehicle unobstructed while in a stored position.

Figure 1:
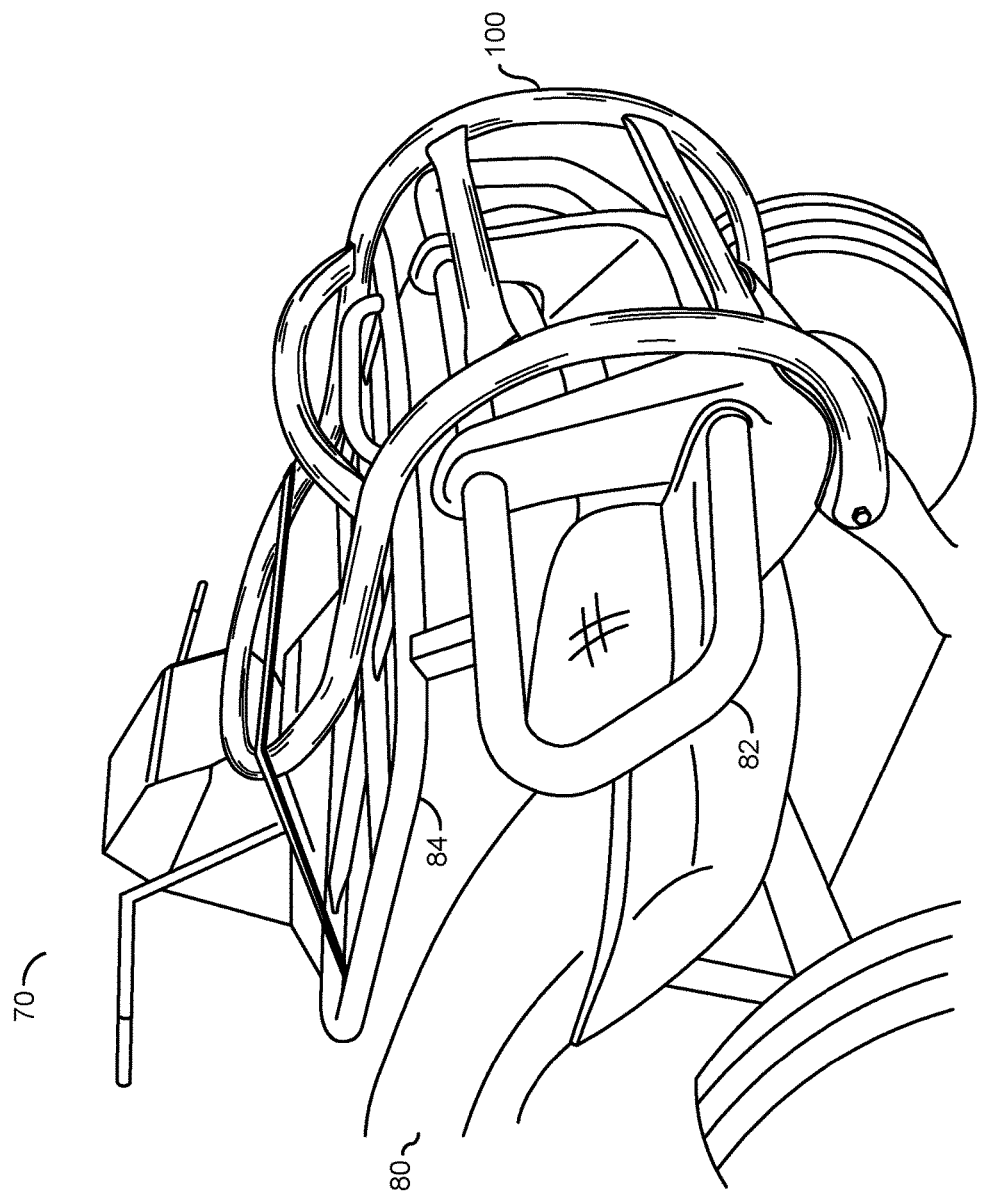
FIG. 1 is a partial diagram illustrating a system in accordance with an embodiment of the invention.

Referring to FIG. 1, a partial diagram illustrating a system 70 is shown in accordance with an embodiment of the invention. The system 70 generally comprises a vehicle 80 and a carrier rack 100. The vehicle 80 may be implemented as an all-terrain vehicle (ATV). The vehicle 80 may include a front bumper 82 and a hood-mounted (or ATV) rack 84. In various embodiments, the carrier rack 100 may be attached to a front end of the vehicle 80. In some embodiments, the carrier rack 100 may be attached to a rear end of the vehicle 80.

The carrier rack 100 is generally illustrated in a stored position. While in the stored position, the carrier rack 100 may be shaped to clear the front bumper 82. A free end of the carrier rack 100 generally extends back across the ATV hood rack 84. The free end of the carrier rack 100 may be shaped to match a contour of a front of the vehicle 80 while stored.

Figure 2:
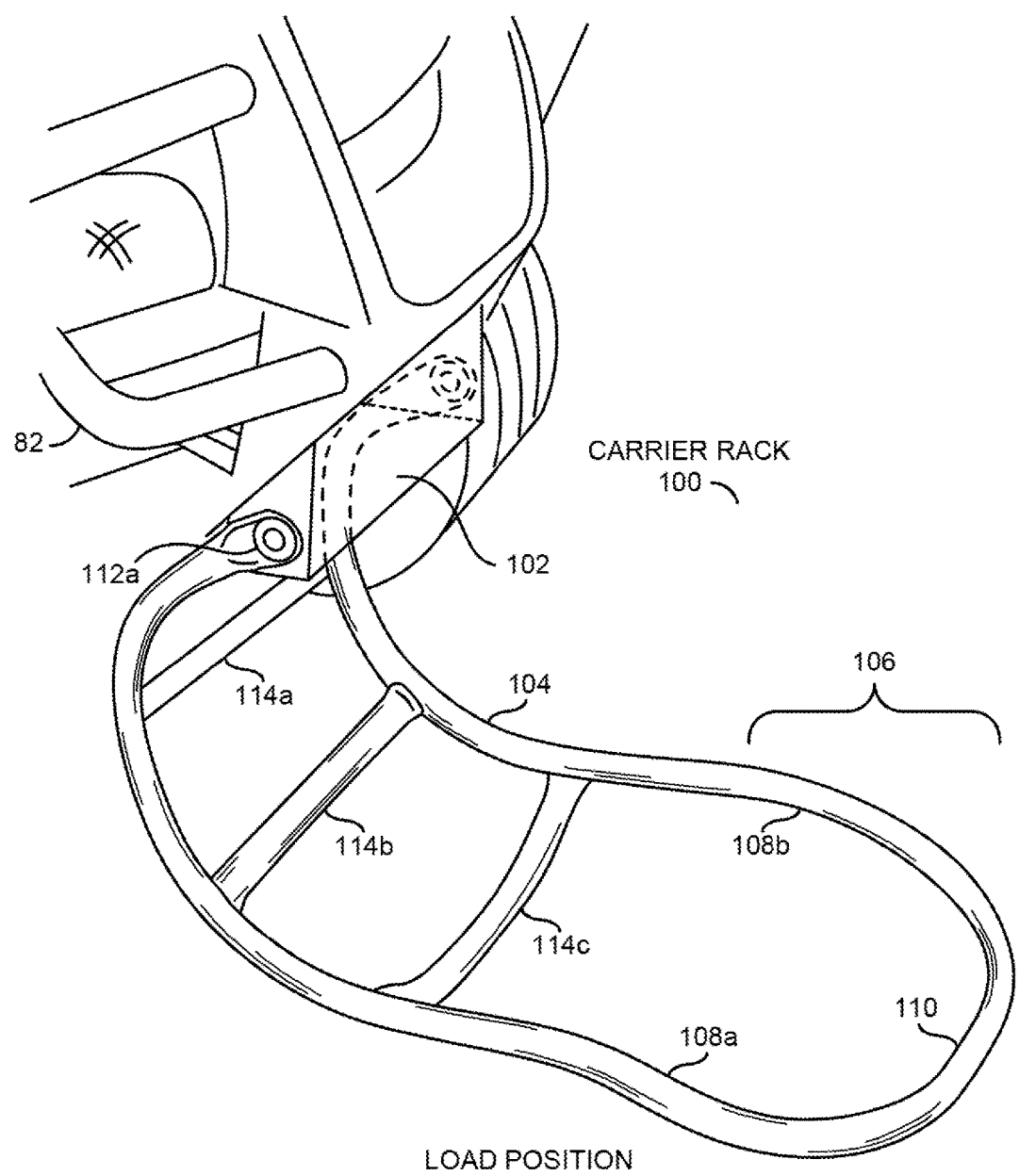
FIG. 2 is a diagram illustrating a perspective view of a carrier rack of the system in accordance with an embodiment of the invention.

Referring to FIG. 2, a diagram illustrating a perspective view of the carrier rack 100 is shown in accordance with an embodiment of the invention. The carrier rack 100 is generally illustrated in a load position. The carrier rack 100 may comprise a bracket 102 and a rail 104. The rail 104 generally has a U-shape 106 forming two side sections 108a-108b separated by a handle section 110. Free ends of the rail 104 may be pivotally attached to the bracket 102 by a pair of joints (or axles) 112a-112b. Multiple cross members (or bars or rungs) 114a-114c may be attached between the side sections 108a-108b of the rail 104. The cross members 114a-114c are generally oriented parallel to the handle section 110.

Figure 3:
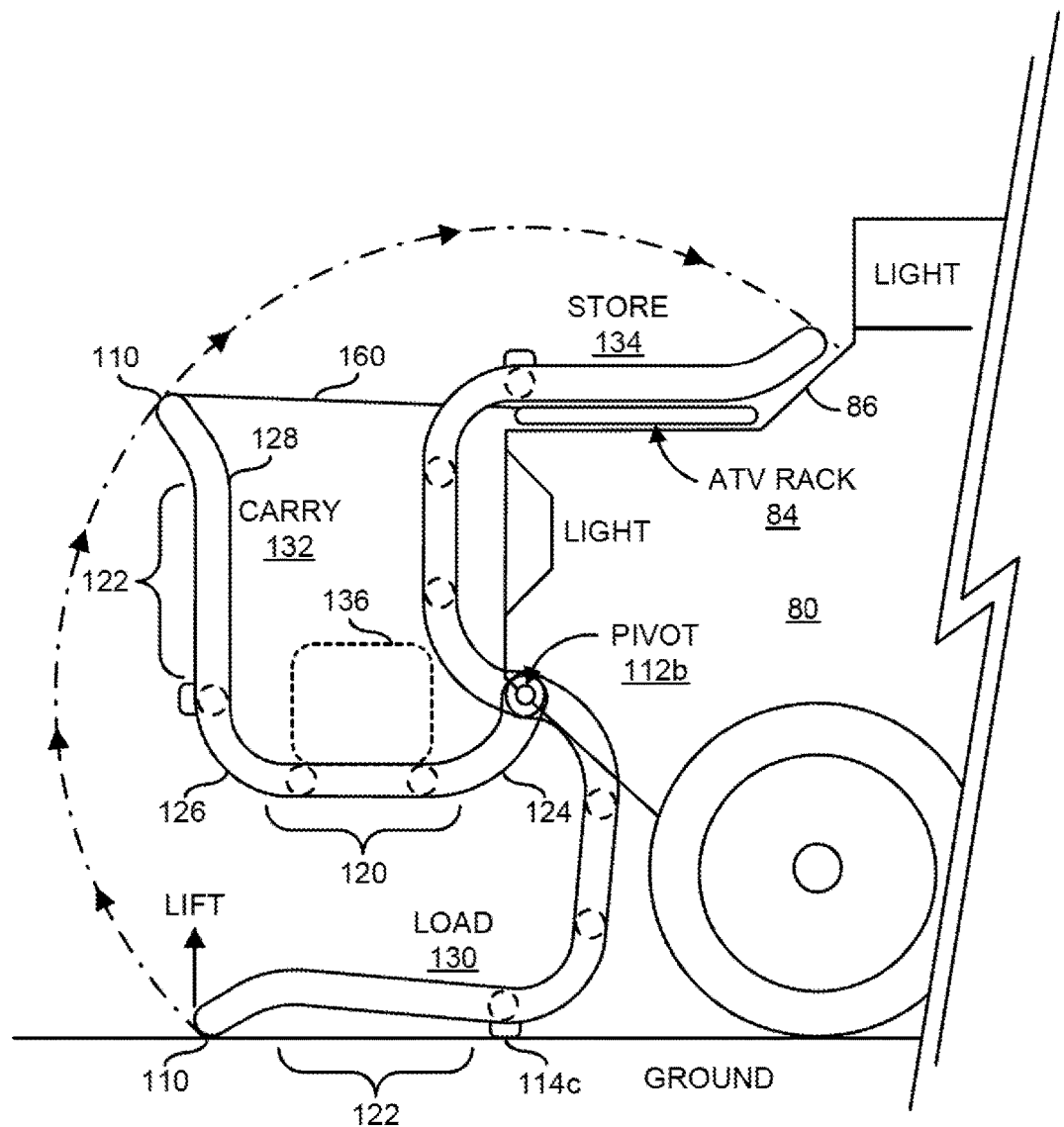
FIG. 3 is a diagram illustrating a side view of the carrier rack in accordance with an embodiment of the invention.

Referring to FIG. 3, a diagram illustrating a side view of the carrier rack 100 is shown in accordance with an embodiment of the invention. The rail 104 generally includes a carry section 120 adjoining the joints 112a-112b. A retainer section 122 may be included in the rail 104 between the carry section 120 and the handle section 110. A load 136 may be positioned on the carrier rack 100 and moved between the carry section 120 and the retainer section 122.

Each side section 108a-108b may include an optional curve 124 between the joints 112a-112b and the carry section 120. Each side section 108a-108b may also include a curve 126 between the carry section 120 and the retainer section 122. The side sections 108a-108b may further include an optional curve 128 between the retainer section 122 and the handle section 110. The rail 104 is generally rotatable about the joints 112a-112b between a load position 130, an intermediate carry position 132 and a stored position 134.

While the carrier rack 100 is in the load position 130, a length of the carry section 120 approximately matches a height of the joints 112a-112b above the ground while the carrier rack 100 is attached to the vehicle 80. The retainer section 122 may be generally horizontal and the handle section 110 may be in contact with the ground. In embodiments where the top cross member 114c is curved out of a plane defined by the side sections 108a-108b, the top cross member 114c may also be in contact with the ground to help keep the load 136 from pulling down on the front of the vehicle 80. With the handle section 110 and/or the top cross member 114c in contact with the ground, the load 136 (e.g., hunting game, feed bails, construction material, tools, camping gear, firewood etc.) may be readily loaded onto and/or removed from the carrier rack 100. Where the side sections 108a-108b have the curve 128 between the handle section 110 and the retainer section 122, a gap may be formed between the side sections 108a-108b and the ground. The gap may be useful for the hands of one or more users to be placed below the rail 104 (e.g., in the retainer section 122) during manual lifting and manual lowering.

While the carrier rack 100 is in the carry position 132, the carry section 120 may be approximately parallel to the ground and the retainer section 122 may be approximately perpendicular to the ground. One or more straps (e.g., a strap 160 is illustrated) may be connected between the handle section 110 and the vehicle 80 (e.g., the ATV rack 84) to hold the carrier rack 100 and possibly the load 136 in place. The horizontal carry section 120 generally provides stable support of the load 136 during transportation. The vertical retainer section 122 may help keep the load 136 from rolling out of the carrier rack 100 during sudden stops and/or while going downhill. The carrier rack 100 is generally capable of receiving, lifting, transporting, lowering and discharging a load 136 weighing up to 300 pounds and located in the carry section 120.

While the carrier rack 100 is in the stored position 134, the retainer section 122 may be approximately parallel to the front-mounted ATV hood rack 84 and/or a hood of the vehicle 80. The straps used during load transportation may also be used to keep the carrier rack 100 secured while in the stored position 134. The straps may adequately secure the carrier rack 100 during transport to insure no damage to the system 70 and/or the vehicle 80, and to provide rider safety.

Figure 4:
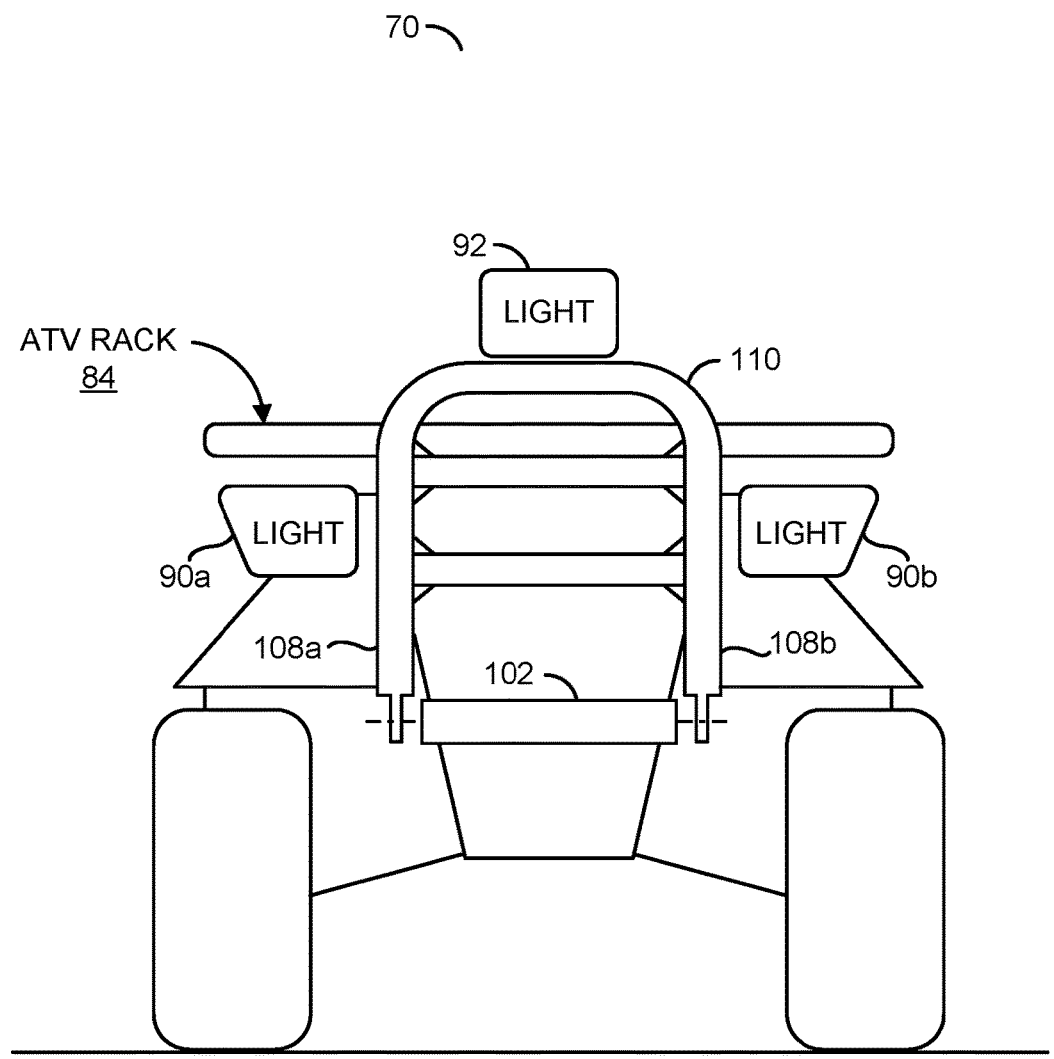
FIG. 4 is a diagram illustrating a front view of the system in accordance with an embodiment of the invention.

Referring to FIG. 4, a diagram illustrating a front view of the system 70 is shown in accordance with an embodiment of the invention. The carrier rack 100 is generally illustrated with the bracket 102 attached to a bottom of the vehicle 80 and the rail 104 is illustrated in the stored position 134. In various embodiments, a width of the rail 104 may be sufficiently narrow such that the side sections 108a-108b are between a pair of headlights 90a-90b mounted on the front of the vehicle 80. In some embodiments, a separation between the side sections 108a-108b place the side sections 108a-108b outside the pair of headlights 90a-90b. As such, the carrier rack 100 does not obstruct the headlights 90a-90b while in any orientation between the stored position 134 and the load position 130. The shape of the rail 104 may be aligned to a profile of the front hood section of the vehicle 80. For example, the retainer section 122 of the rail 104 may be located on or just above the ATV rack 84 while in the stored position 134. Another headlight 92 of the vehicle 80 may be mounted on a steering column of the vehicle 80. The headlight 92 may be unobstructed by the handle section 110 of the rail 104 while in the stored position 134.

Figure 5:
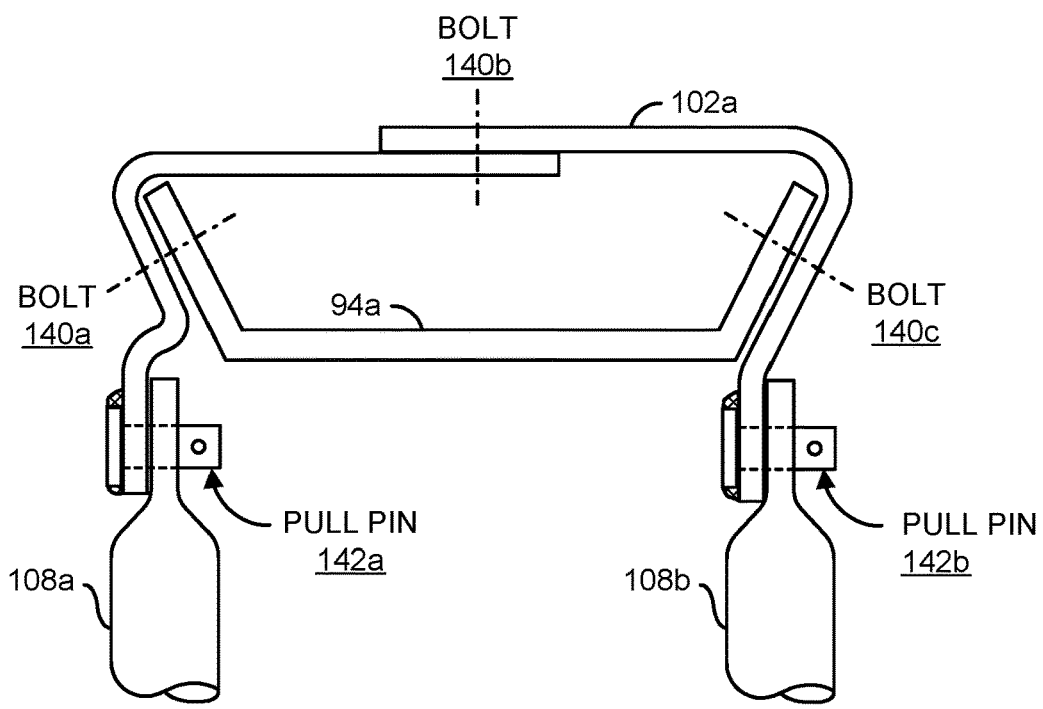
FIG. 5 is a diagram illustrating a front view of a bracket in accordance with an embodiment of the invention.

Referring to FIG. 5, a diagram illustrating a front view of a bracket 102a is shown in accordance with another embodiment of the invention. The bracket 102a may be a variation of the bracket 102. The brackets 102 and/or 102a may be customized to adapt to different types of vehicles 80. Either bracket 102 or 102a may be used with the same rail 104. Therefore, the rail 104 may be interchangeable with different brackets 102/102a on different vehicles.

In various embodiments, an appropriate mounting structure 94a of the vehicle 80 may have multiple surfaces. For example, the mounting structure 94a may have a bathtub-curve shape. To accommodate the surfaces, the bracket 102a may be configured to wrap around the mounting structure 94a. The bracket 102a generally comprises multiple pieces. The pieces may be attached to the mounting structure 94a by one or more bolts 140a and 140c. Another bolt 140b may hold together the two pieces of the bracket 102a.

The bracket 102 and/or 102a may be attached to the side sections 108a-108b by a pair of pull pins 142a-142b. The pull pins 142a-142b may allow for rapid mounting and dismounting of the rail 104 on and off the bracket 102/102a. As such, the rail 104 portion of the carrier rack 100 may be rapidly mounted and dismounted from the vehicle 80. The pins 142a-142b may include holes to accept cotter pins or R-clips to retain the pins in place. In various embodiments, the pull pins 142a-142b may be replaced by bolts, rivets or shafts to provide permanent joints 112a-112b between the bracket 102 and the side sections 108a-108b.

Figure 6:
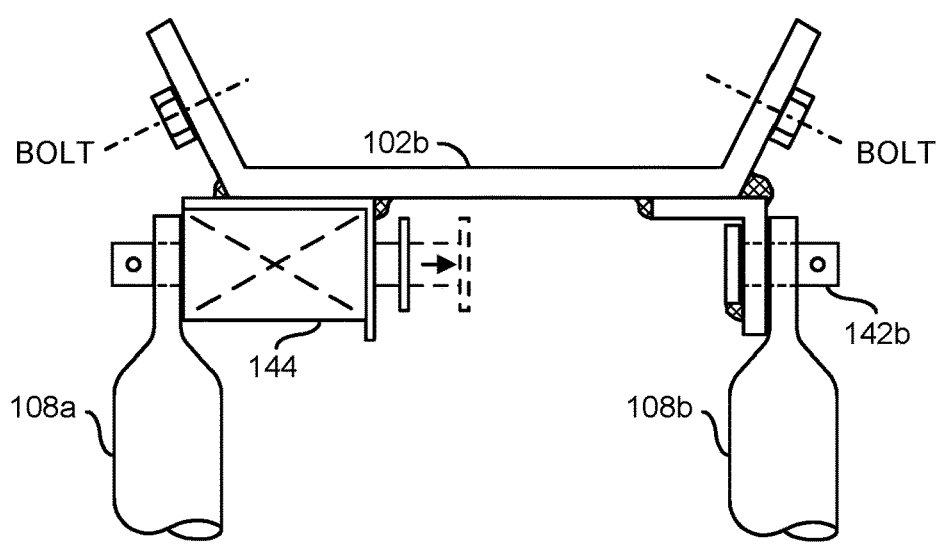
FIG. 6 is a diagram illustrating a front view of a bracket in accordance with another embodiment of the invention.

Referring to FIG. 6, a diagram illustrating a front view of a bracket 102b is shown in accordance with another embodiment of the invention. In some embodiments, the bracket 102b may be shaped to match the shape of the mounting structure 94a (see FIG. 5) of the vehicle 80. The bracket 102b may be a variation of the brackets 102 and/or 102a. The bracket 102b may be bolted to the mounting structure 94a similar to how the bracket 102a may be bolted to the mounting structure 94a.

The bracket 102, 102a and/or 102b may be attached to the side sections 108a-108b by one of the pull pins 142a-142b (e.g., the pull pin 142b) and a spring-loaded pivot pin 144. The spring-loaded pivot pin 144 may allow for simple mounting and dismounting of the rail 104 from the bracket 102/102a/102b. In some embodiments, a hole may be provided in the pin to receive a cotter pin or an R-clip to prevent an accidental disconnect. Therefore, mounting and dismounting of the rail 104 from the vehicle 80 may likewise be simple to perform.

Figure 7:
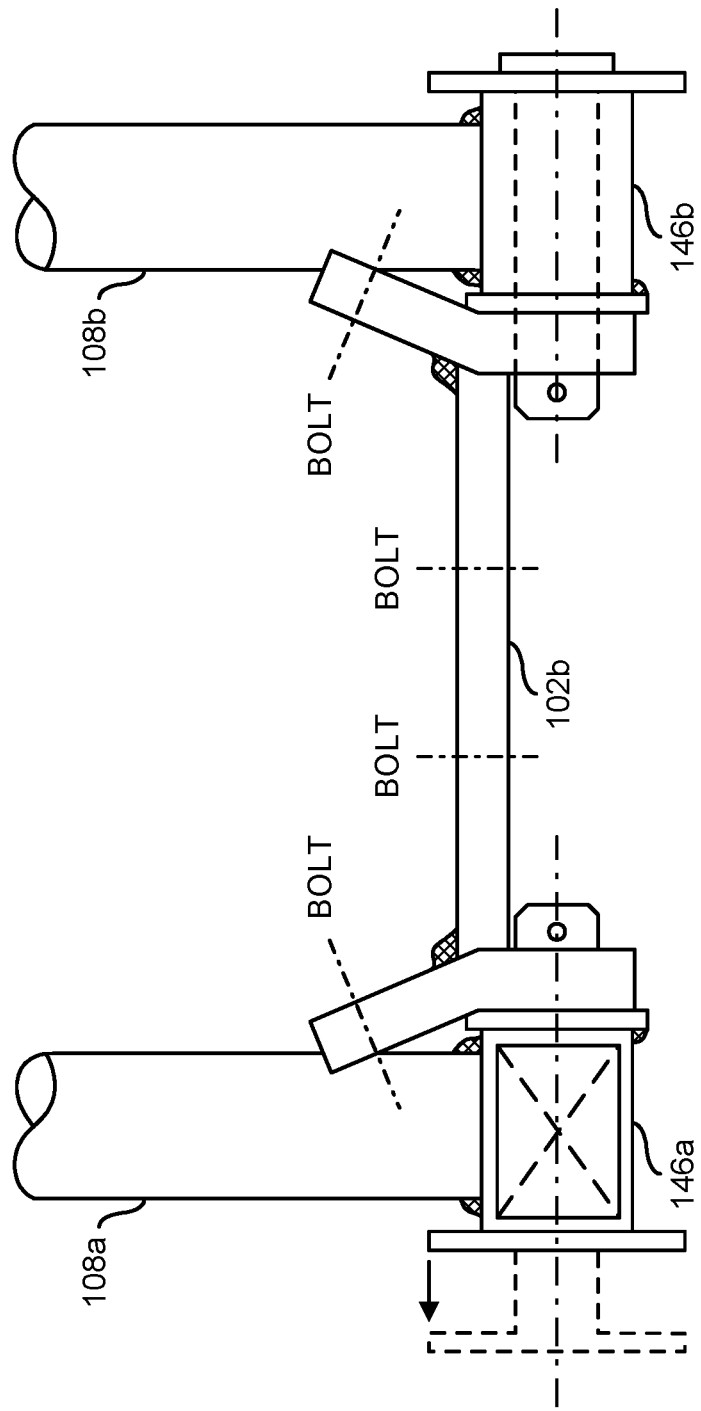
FIG. 7 is a diagram illustrating a partial view of the bracket of FIG. 6 in accordance with an embodiment of the invention.

Referring to FIG. 7, a diagram illustrating a top view of the bracket 102b is shown in accordance with an embodiment of the invention. In some embodiments, the bracket 102b may be attached to the mounting structure of the vehicle 80 using multiple bolts along multiple surfaces. As illustrated, the bracket 102b may be attached to the mounting structure using four bolts at three surfaces. Other numbers of bolts and surfaces may be used to meet the design criteria of a particular application.

The bracket 102, 102a and/or 102b may be attached to the side sections 108a-108b by a pair of pins 146a-146b. The pin 146a may implement a spring-loaded pivot pin used to lock the rail 104 into the mounting bracket 102. The pin 146b may be implemented as a fixed pivot pin. The rail 104 may be installed into the fixed pivot pin 146b and subsequently locked in place with the spring-loaded pivot pin 146a. Additional holes in the pins 146a-146b may be provided for cotter pins or R-clips for additional security. The pins 146a-146b may provide quick-disconnect joints that allow for quick mounting and dismounting of the rail 104 from the bracket 102/102a/102b. As such, the rail 104 portion of the carrier rack 100 may be quickly mounted and dismounted from the vehicle 80.

Figure 8:
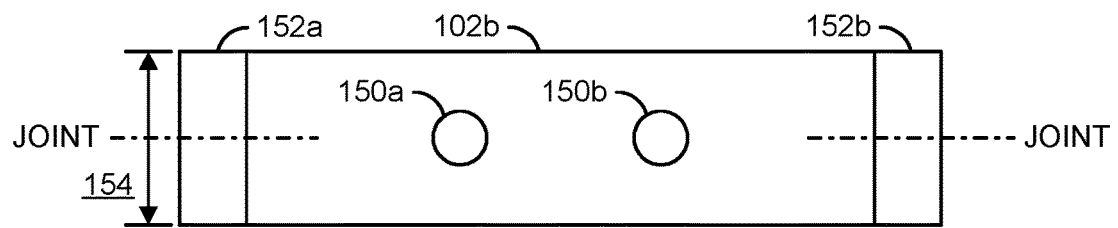
FIG. 8 is a diagram illustrating a top view of the bracket of FIG. 6 in accordance with an embodiment of the invention.

Referring to FIG. 8, a diagram illustrating a front view of the bracket 102b is shown in accordance with an embodiment of the invention. The bracket 102b may include multiple bolt holes 150a-150b and a pair of arms 152a-152b for attaching to the side sections 108a-108b of the rail 104. In various embodiments, a width 154 of the bracket 102b may be as small as 1.0 to 1.5 inches. Other widths may be implemented to meet the design criteria of a particular application.

Figure 9:
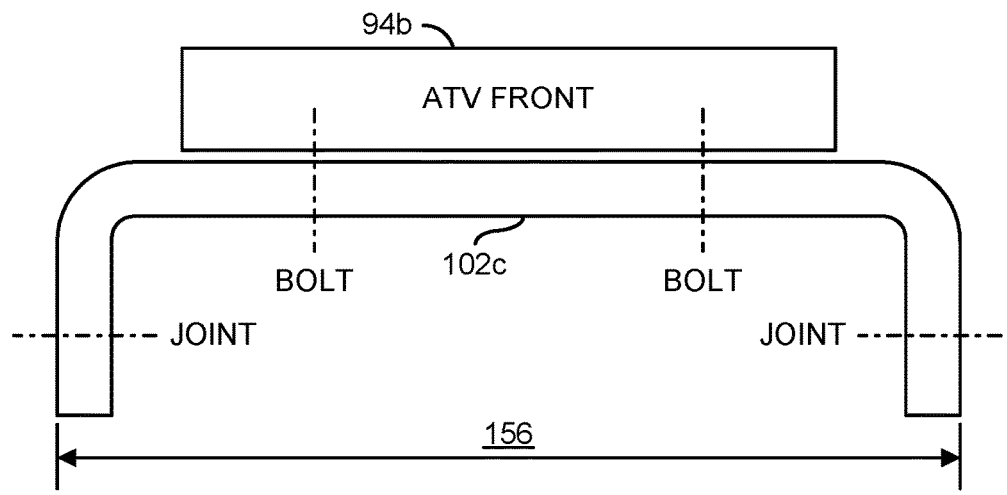
FIG. 9 is a diagram illustrating a top view of a bracket in accordance with another embodiment of the invention.

Referring to FIG. 9, a diagram illustrating a top view of a bracket 102c is shown in accordance with another embodiment of the invention. The bracket 102c may be a variation of the brackets 102, 102a and/or 102b. The bracket 102c may be configured to mount on a mounting structure 94b of the vehicle 80. The mounting structure 94b and the bracket 102c may have matched flat surfaces where the two are joined. Multiple (e.g., two or more) bolts are generally used to secure the bracket 102c to the mounting structure 94b. The bracket 102c generally extends horizontally from the mounting structure 94b away from the vehicle 80. In various embodiments, a width 156 of the bracket 102c may match a width of the mounting structure 94b. The mounting structure 94b may be variable per ATV manufacturer. Therefore, many bolt pattern options may exist and the placement of the bolts may vary as appropriate. In some embodiments, the width 156 may be slightly narrower than that of the mounting structure 94b. The narrow width may be appropriate to avoid obstructing the headlights 90a-90b (FIG. 4). In other embodiments, the width 156 may be slightly longer than the width of the mounting structure 94b to provide for better lateral stability when carrying large loads 136.

Figure 10:
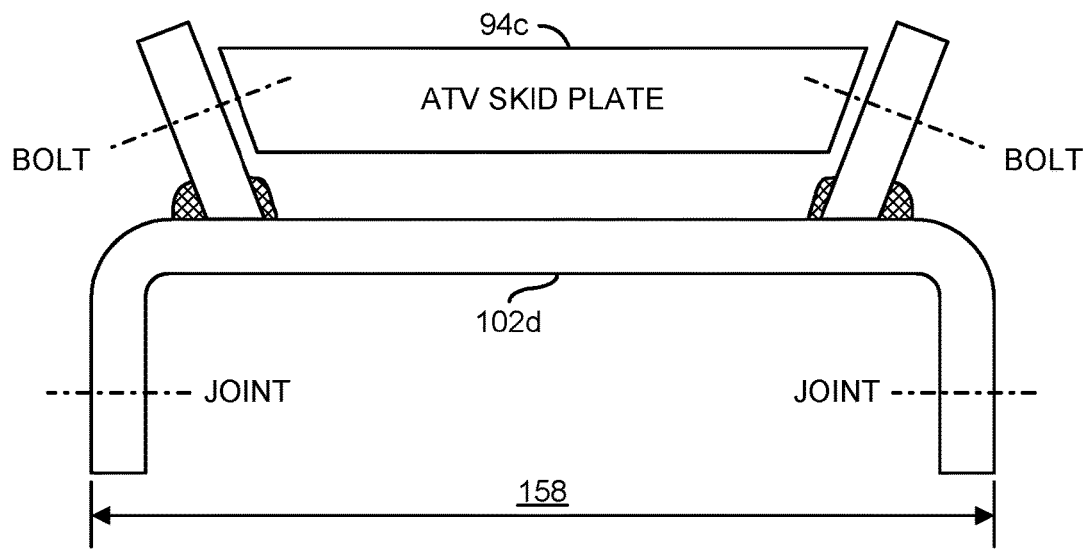
FIG. 10 is a diagram illustrating another view of the bracket of FIG. 9 in accordance with an embodiment of the invention.

Referring to FIG. 10, a diagram illustrating a bracket 102d is shown in accordance with an embodiment of the invention. The bracket 102d may be a variation of the brackets 102, 102a, 102b and/or 102c. The bracket 102d may be configured to mount on a skid plate 94c of the vehicle 80. In some embodiments, the skid plate 94c may have a trapezoidal shape. The skid plate 94c and the bracket 102d may have a pair of angled surfaces where the two are joined. The bracket 102d generally extends vertically downward below the vehicle 80. Multiple (e.g., two or more) bolts are generally used to secure the bracket 102d to the skid plate 94c. In various embodiments, a width 158 of the bracket 102d may be wider than a width of the skid plate 94c. Other widths may be implemented to meet the design criteria of a particular application.

Figure 11:
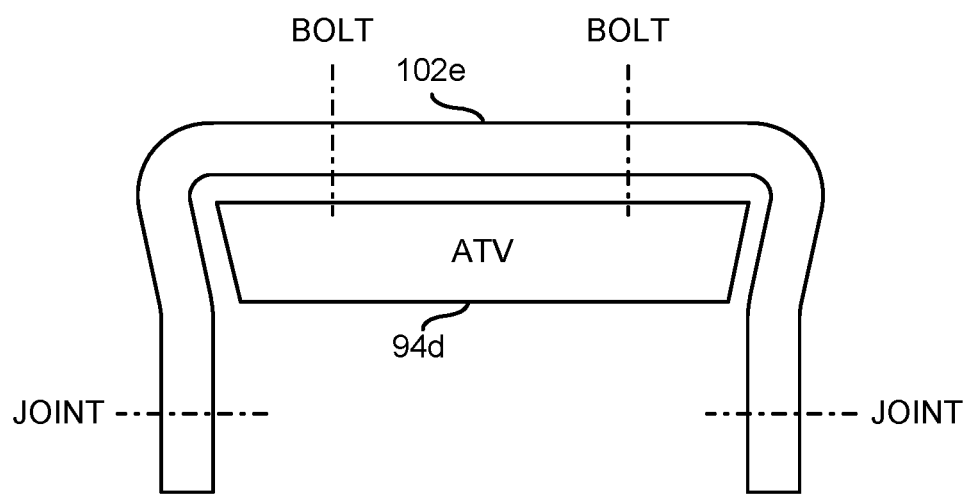
FIG. 11 is a diagram illustrating a bracket in accordance with another embodiment of the invention.

Referring to FIG. 11, a diagram illustrating a bracket 102e is shown in accordance with another embodiment of the invention. The bracket 102e may be a variation of the brackets 102, 102a, 102b, 102c and/or 102d. The bracket 102e may be configured to mount between a mounting surface 94d of the vehicle 80 and the rest of the vehicle. The mounting surface 94d and the bracket 102e may have matching surfaces where the two are joined. Multiple (e.g., two or more) bolts are generally used to secure the bracket 102e to the mounting surface 94d. The bracket 102e generally wraps around the sides of the mounting surface 94d and extends horizontally, vertically, or at any other angle away from the vehicle 80.

Figure 12:
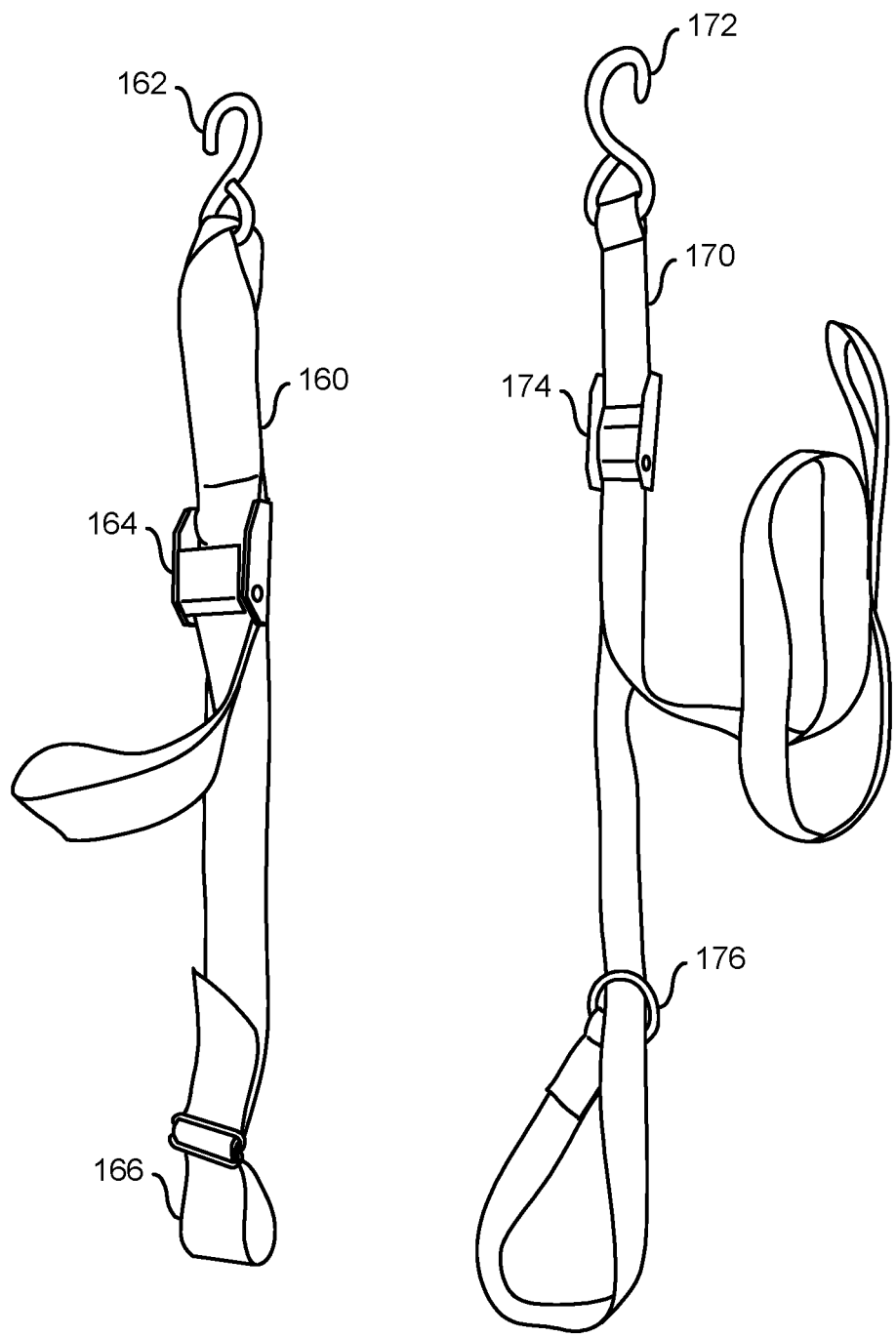
FIG. 12 is a diagram illustrating multiple strap designs in accordance with an embodiment of the invention.

Referring to FIG. 12, a diagram illustrating multiple example strap designs is shown in accordance with an embodiment of the invention. A frame-style strap 160 and a load-style strap 170 are illustrated. The strap 160 generally comprises a hook 162, an adjustable buckle 164 and a loop 166. The loop 166 may be configured to attach to the rail 104 at or near the handle section 110. The hook 162 is generally configured to alternately connect and disconnect to the ATV rack 84. The adjustable buckle 164 may be operational to adjust a length, and thus tension, of the strap 160 to accommodate different sized loads 136 and/or to adjust a position of the rail 104.

The strap 170 generally comprises a hook 172, an adjustable buckle 174 and a ring 176 (e.g., a D-ring). The ring 176 may be doubled back over the strap 170 to form a loop. The loop may be configured to secure the load 136. The hook 172 is generally configured to alternately connect and disconnect to the ATV rack 84. The adjustable buckle 174 may be operational to adjust a length of the strap 170 to accommodate different sized loads 136 and/or different ways of attaching to the load 136.

Figure 13:
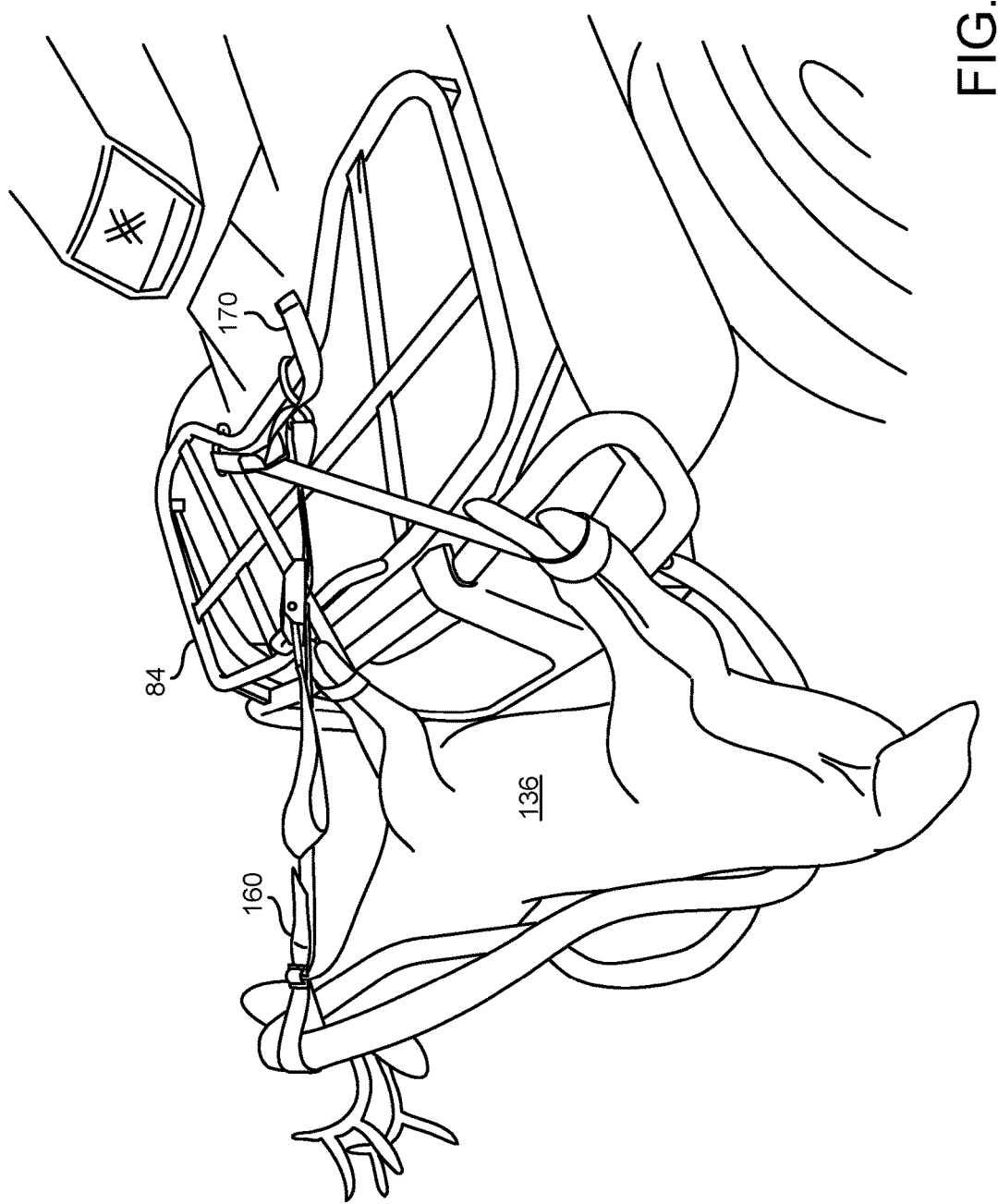
FIG. 13 is a diagram illustrating use of the straps on the vehicle with a load in accordance with an embodiment of the invention.

Referring to FIG. 13, a diagram of an example use of the straps on the vehicle 80 and load 136 is shown in accordance with an embodiment of the invention. The rail 104 is generally illustrated in the carry position 132 and cradling a load (e.g., a deer) 136. The strap 160 may be connected between the handle section 110 and the ATV rack 84 and adjusted to maintain the rail 104 in the carry position 132. A strap 170 may be connected between the hind legs of the deer load 136 and the ATV rack 84. Another strap 170 may be connected between the front legs of the deer load 136 and the ATV rack 84. The loops formed at one end of each strap 170 may be quickly placed over and subsequently tighten around the corresponding set of legs. The adjustable buckles 174 may be used to account for variations in the distances between the legs and respective secure points on the ATV rack 84.

The functions and structures illustrated in the diagrams of FIGS. 1 to 13 may be designed, modeled, emulated, and/or simulated using one or more of a conventional general purpose processor, digital computer, microprocessor, microcontroller, distributed computer resources and/or similar computational machines, programmed according to the teachings of the present specification, as will be apparent to those skilled in the relevant art(s). Appropriate software, firmware, coding, routines, instructions, opcodes, microcode, and/or program modules may readily be prepared by skilled programmers based on the teachings of the present disclosure, as will also be apparent to those skilled in the relevant art(s). The software is generally embodied in a medium or several media, for example non-transitory storage media, and may be executed by one or more of the processors sequentially or in parallel.

The terms "may" and "generally" when used herein in conjunction with "is(are)" and verbs are meant to communicate the intention that the description is exemplary and believed to be broad enough to encompass both the specific examples presented in the disclosure as well as alternative examples that could be derived based on the disclosure. The terms "may" and "generally" as used herein should not be construed to necessarily imply the desirability or possibility of omitting a corresponding element.

While the invention has been particularly shown and described with reference to embodiments thereof, it will be understood by those skilled in the art that various changes in form and details may be made without departing from the scope of the invention.

The invention claimed is:

1. An apparatus comprising:
    a bracket attachable to a vehicle; and
    a rack comprising (i) a rail having a U-shape forming two side sections separated by a handle section, (ii) a respective joint at each free end of said rail and pivotally connected to said bracket and (iii) a plurality of cross members attached between said side sections of said rail and parallel to said handle section, wherein (a) said rail forms a carry section adjoining said joints, (b) said rail forms a retainer section between said carry section and said handle section, (c) said side sections include a first curve between said carry section and said retainer section, (d) said rail is rotatable about said joints between a load position and a stored position, (e) said handle section is in contact with a ground while said rack is in said load position, (f) said retainer section is adjacent to a hood of said vehicle while said rack is in said stored position, (g) said retainer section is upright relative to said ground while said rack is in a carry position between said load position and said stored position, (h) said side sections have a second curve between said handle section and said carry section thereby forming a gap between said side sections and said ground while said rack is in said load position and said handle section is in contact with said ground, and (i) said second curve matches a profile of said hood of said vehicle.

2. The apparatus according to claim 1, wherein said first curve is configured to enable a load placed on said retainer section while said rack is in said load position to slide into said carry section while said rack is rotated from said load position into said carry position.

3. The apparatus according to claim 1, wherein said carry section has a shape configured to clear a front bumper of said vehicle while said rack is in said stored position.

4. The apparatus according to claim 1, wherein a length of said carry section corresponds to a height of said joints above said ground while said bracket is attached to said vehicle.

5. The apparatus according to claim 1, wherein a separation of said side sections of said rail are less than a spacing between a pair of headlights of said vehicle such that a headlight pattern is unobstructed while said rack is in said stored position.

6. The apparatus according to claim 1, wherein at least one of said joints comprises a quick-disconnect joint.

7. The apparatus according to claim 1, wherein one of said joints comprises a spring-loaded pin and another of said joints comprises a fixed pin.

8. The apparatus according to claim 1, wherein a separation between said joints matches a width of a mounting surface of said vehicle.

9. The apparatus according to claim 1, wherein a separation between said joints is wider than a width of a mounting surface of said vehicle.

10. The apparatus according to claim 1, wherein said bracket is positioned between a mounting surface and a bottom of said vehicle.

11. The apparatus according to claim 1, wherein at least one of said cross members is curved to contact said ground while said rack is in said load position.

12. The apparatus according to claim 1, wherein said rail and said handle section provide sufficient leverage to manually raise a load up to 300 pounds and located in the carry section from said load position to the carry position.

13. The apparatus according to claim 1, wherein said joints comprise a plurality of pull pins.

14. The apparatus according to claim 1, wherein said joints comprise a fixed pin and a spring-loaded pin.

15. The apparatus according to claim 1, wherein said joints comprise a plurality of quick-disconnect pins.

16. The apparatus according to claim 1, wherein said rack leaves a hood rack of said vehicle unobstructed while not in said stored position.

17. The apparatus according to claim 1, wherein a given one of said cross members is curved out of a plane defined by said side sections of said rail, and contacts said ground while said rack is in said load position.

18. The apparatus according to claim 17, wherein said carry section is located between said given one of said cross members and said handle section.

* * * * *